Oct. 11, 1932.     S. D. LEVINGS     1,882,247
COFFEE URN
Filed March 23, 1931     2 Sheets-Sheet 2
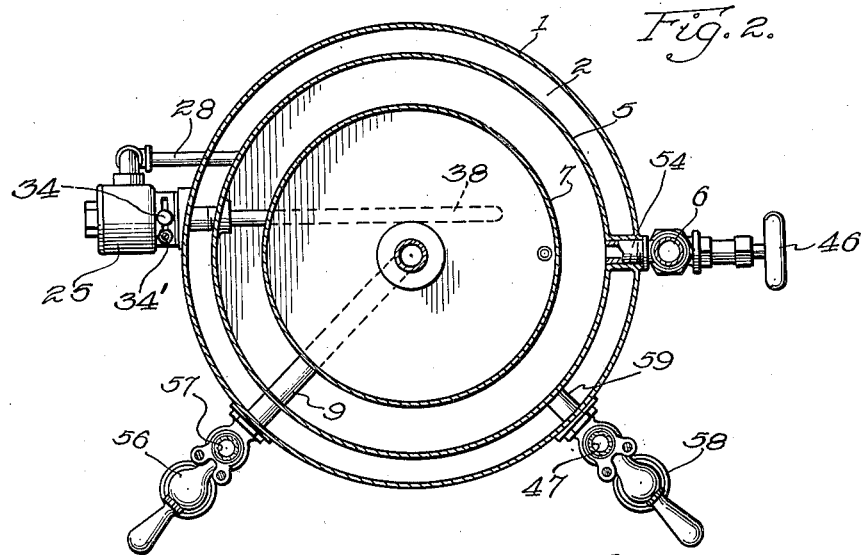
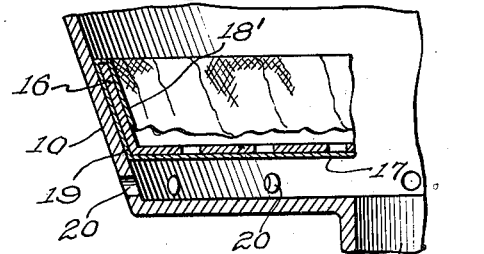
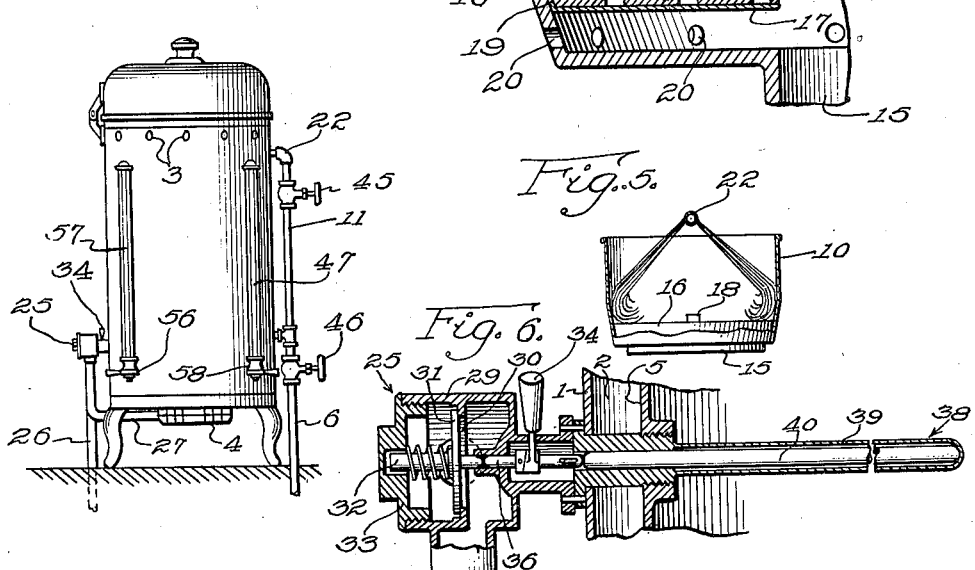
Inventor
Sherburne Davis Levings Patented Oct. 11, 1932

1,882,247

UNITED STATES PATENT OFFICE

SHERBURNE DAVIS LEVINGS, OF WINNETKA, ILLINOIS

COFFEE URN

Application filed March 23, 1931. Serial No. 524,617.

This invention relates to the coffee making art, and especially to an improved form of coffee urn adapted for the making of drip coffee, and more especially to such urns adapted for commercial use in making coffee in large quantities for dispensing over long periods, as for instance, in hotels and restaurants.

The main objects of the invention are to provide a coffee urn of the general character referred to of improved, simplified and more efficient form and design; to provide such an urn adapted for ready manual control and adjustment to maintain predetermined temperatures for indefinite periods; to provide for ready supply of fresh water, proper heating thereof and ultimate discharge of the hot water upon a combined dripper and strainer whereon the ground coffee is supported; to provide means for ready indication of the condition of the urn with respect to the amount of water and also the amount of prepared coffee therein; and to provide for ready access to the interior and removal of necessary parts incident to cleaning and maintenance.

This invention is illustrated by the accompanying drawings, in which

Fig. 2 is mainly a horizontal section on the line 2—2 of Figure 1.

Fig. 3 is a side elevation of the urn on a much reduced scale, as viewed from the lower side of Fig. 2.

Fig. 4 is a greatly enlarged fragmentary detail of the dripper, strainer disc and cloth such as indicated on a small scale in the upper part of Fig. 1.

Fig. 5 is a vertical section somewhat reduced through the upper part of Fig. 1 on the line 5—5 thereof.

Fig. 6 is a vertical axial section much enlarged, through the gas supply valve and its control thermostat, which equipment is shown in side elevation near the lower left hand corner of Fig. 1.

Figure 1:
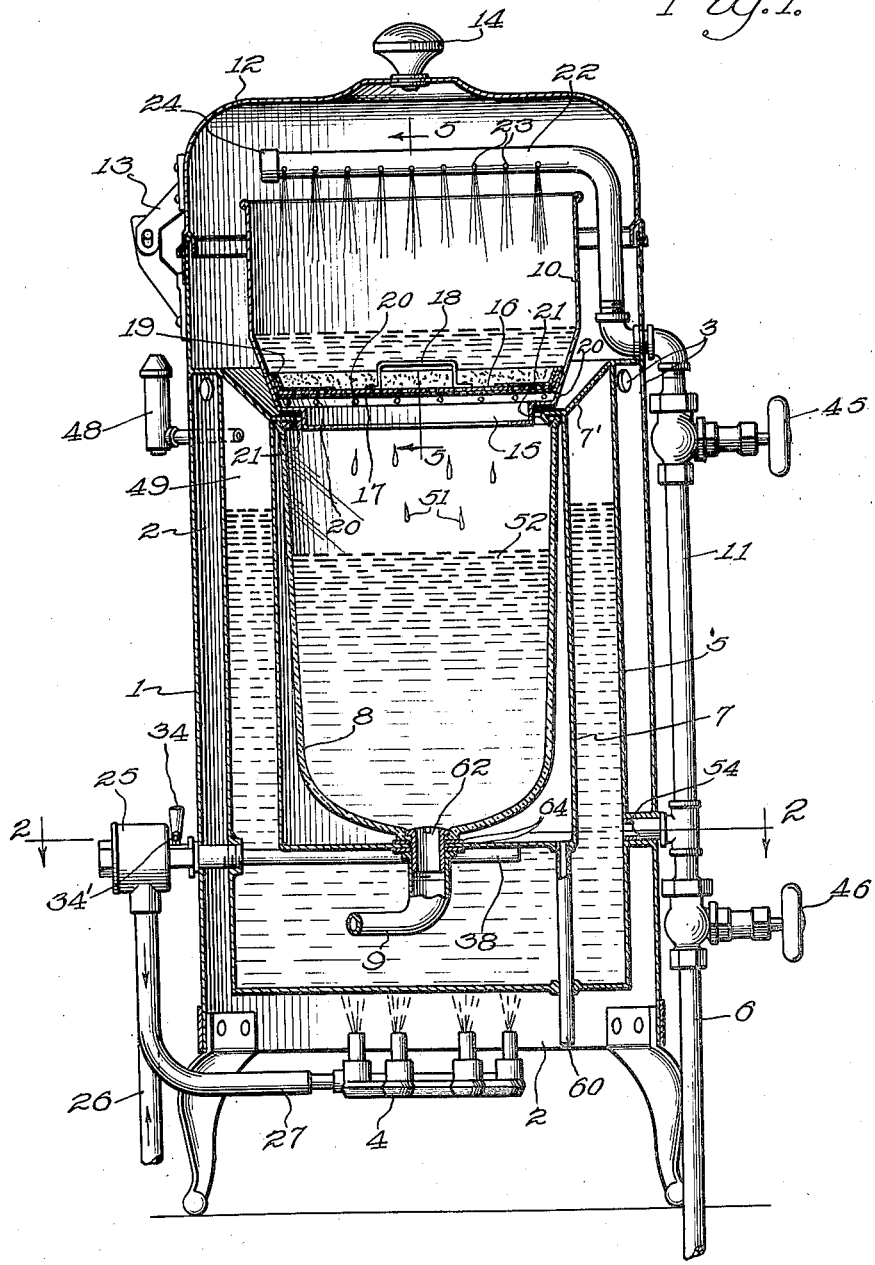
Figure 1 is mainly a vertical axial section through my improved coffee urn.

Referring more in detail to the construction shown in said drawings, the urn as a whole comprises an upright sheet-metal body casing 1, having a combustion and heating chamber 2 therein, with outlets indicated by the holes 3, a gas burner 4 at the lower end of said chamber, a water receptacle 5 set in said chamber, means 6 for supplying water to said receptacle, a chambered inner casing 7 within said receptacle, a coffee holder 8 of glass disposed within said inner casing and having discharge means 9 for dispensing coffee therefrom, a coffee dripper 10 such as is generally known in the trade as a "French" dripper set over said holder, and means 11 to feed hot water from said receptacle to said dripper.

There are numerous accessories and details, the more important of which will now be described. The casing 1 is provided at its upper end with a cover 12 hinged thereto at 13, for enabling ready access to the interior of the urn and especially to permit ready charging of the dripper with fresh coffee and subsequent removal of the grounds therefrom. For convenience in operation the said cover 12 is provided with a handle 14.

The dripper 10 is of cylindrical shape and its main body part is open downwardly, as indicated at 15, where it is convergent, and serves to support the perforated coffee pan or disc 16, of colander like design.

Interposed between the upward flanges of the disc 16 and the inclined wall of the dripper 10 is a cloth or fabric strainer 17, the main body of which underlies the disk and the peripheral edges of which are folded inwardly and lie against the rim of the disc. This disc is provided with a handle 18 to facilitate manipulation and especially to enable one to lift it out of the dripper for removal of grounds after the coffee has been made.

The outer portions of the strainer fabric being clamped at 19 in a gravity locked joint between the flaring portions of the dripper 10 and pan 16, is readily assembled and may be easily renewed whenever required.

The numerous holes 16' in the bottom of the drip pan 16 permit the liquid coffee formed in the grounds to percolate downwardly and drip into the holder 8 ready for dispensing to customers.

In order to permit water or coffee to be poured into the coffee holder 8 without passing through the grounds, the lower part of the side walls of the dripper 10 may have a ring of perforations 20 to which such liquid will be guided by the funnel shaped walls 7' whereupon the liquid will flow into the holder 8.

In order to supply hot water to the finely ground coffee in the pan 16, a perforated supply tube 22 is disposed above and across the dripper 10, said tube having two series of holes 23 directed diagonally downward and outward to discharge the water substantially against the inner sides of the dripper as illustrated in Fig. 5. The inner end of said tube is closed by a cap 24.

The supply of gas to the burner 4 is permanently fastened in fixed relation to the bottom of the water heater and regulated by a control means 25 which is connected to a fuel source 26 and which has a feed pipe 27 leading to the burner. Said device 25 also has a branch pipe 28 leading to a pilot burner as will be understood, though not shown.

The device 25 comprises a main shell or casing 29 having a vertical wall provided with a port 30 which is normally closed by a spring actuated valve 31. This valve 31 has a stem 32 extending outwardly in one direction to fit loosely in the apertured guide cap 33 and in the opposite direction for thermostatic and manual control as will be described.

A valve control handle 34 is connected to actuate a cam 35 arranged to actuate the elementary shaft section 36 endwise against the inner end of the valve stem.

The inner end part 37 of member 26 is so formed and mounted as to prevent rotation thereof, as will be understood. This end 37 cooperates with a thermostat 38. This thermostat comprises a shell 39 preferably of brass, and a loose fitting core 40 having a widely different coefficient of expansion, in response to temperature changes, carbon being best adapted.

The operation and use of this device will now be described. The hot water valve 45 being closed, the cold water supply valve 46 is opened, whereupon water from the supply pipe 6 will flow into the hot water receptacle 5. This flow is continued until the water level indicated in the gauge tube 47 corresponds with the desired quantity of coffee to be made. The valve 46 is then closed.

In order to heat the water to the boiling point the attendant then pushes the handle 34 of controller 25 backwardly, as viewed in Figs. 1 and 6, thus opening the valve 31 and permitting an increase in gas flow through tube 27 to the burner. Either at this time or previously the attendant adjusts the coffee receiving drip pan 16 in the dripper 10, with the strainer cloth 17 in place, and thereupon places the dry, coarse, pulverized coffee in the pan.

As soon as the water has arrived at the boiling point and generates steam pressure, this condition will be indicated by the pop-valve 48. The operator then pulls the handle 34 forward against the set screw stop 34' (see Figs. 1 and 2) and then opens valve 45 which permits the pressure of the steam generated at 49 to force the hot water from receptacle 5 upward through the tube 11 to the discharge tube 22 from whence it is sprayed through the holes 23 into the dripper 10. The hot water thus discharged into the dripper percolates downward through the loose coffee and thereby produces the "drip coffee" represented by the drops 51 in Fig. 1 and the coffee collected in the holder 8 as indicated at 52.

As will be apparent from Fig. 1 only that part of the water in receptacle 5 above the flow passageway 54 will be discharged, a substantial quantity of hot water being left in the lower part wherein the thermostat 38 remains submerged. In order to maintain the coffee at an appropriate temperature for an indefinite period or while the coffee is being dispensed, heat is supplied at the required moderate rate by the burner 4, the handle 34 being adjusted in advance by means of a set screw as to position, so as to set the valve 31 to a position where the thermostat maintains the desired and fixed temperature.

When the temperature of the water diminishes from any cause the brass shell 39 contracts and thereby thrusts the carbon rod 40 outwardly against the shaft 37 which in turn reacts against the inner end of stem 32 and thereby moves the valve 31 slightly outward and away from its seat, whereby the rate of fuel feed is increased sufficiently to restore the desired temperature.

When the water temperature exceeds the degress desired the brass shell 39 expands and permits the valve closure spring to push the valve 31, stem 32, shaft 37 and carbon rod 40 inward sufficiently to compensate for the overheating by cutting down the rate of fuel supply.

In dispensing the coffee, as for instance by the cupful, the manual valve 56 is operated, whereby coffee from the holder 8 is caused to discharge by gravity through the tube 9, which tube being disposed mainly in the lower part of receptacle 5 is kept hot by the water in which it is immersed. The amount of coffee in the holder 8 is indicated visually by the gauge 57.

If or whenever hot water is to be dispensed, the attendant operates the valve 58, which permits hot water to discharge from receptacle 5 through the tube 59.

A vent drip tube 60 extends downward from the bottom of the inner casing 7 so as to prevent the accumulation of moisture in said casing.

A fluid tight connection is provided for the pipe 9 at the bottom of holder 8, for which purpose a hollow screw 62 fits in the discharge hole in the bottom of holder 8, the head of the screw resting on an appropriate shoulder formed on said holder, and the lower end of the screw engaging the correspondingly threaded upper end of tube 9, the bottom of casing 7 being appropriately apertured and gaskets 64 being interposed on opposite sides of the floor of casing 7, and being clamped between the lower edge of holder 8 and the upper flanged edge of pipe 9.

Although but one embodiment of this invention is herein shown and described, it is to be understood that numerous details may be altered or omitted without departing from the spirit of the invention as defined by the following claim:

I claim:

A system of apparatus for making coffee comprising a water heating receptacle, a coffee jar communicatively related to said receptacle, means for heating the water in said receptacle and means to control the generation of heat for a variable range of temperatures, said control means including a thermostat comprising means for cutting out the operation of the thermostat to control the higher temperatures and for cutting in the thermostat for controlling the lower range of temperatures, which thermostat is responsive to the contents of said receptacle.

Signed at Chicago this 16th day of March 1931.

SHERBURNE D. LEVINGS.